United States Patent
Haga

(10) Patent No.: US 11,807,372 B2
(45) Date of Patent: Nov. 7, 2023

(54) CONTROL DEVICE OF FLYING OBJECT

(71) Applicant: HONDA MOTOR CO., LTD., Tokyo (JP)

(72) Inventor: Hisao Haga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/969,713

(22) Filed: Oct. 20, 2022

(65) Prior Publication Data
US 2023/0192305 A1 Jun. 22, 2023

(30) Foreign Application Priority Data
Dec. 21, 2021 (JP) ................................ 2021-207198

(51) Int. Cl.
| | |
|---|---|
| *B64D 27/24* | (2006.01) |
| *B64C 11/30* | (2006.01) |
| *B60L 58/15* | (2019.01) |
| *B60L 58/13* | (2019.01) |
| *B60L 58/14* | (2019.01) |
| *B60L 58/12* | (2019.01) |
| *B64D 27/02* | (2006.01) |
| *F02C 9/58* | (2006.01) |
| *F01D 7/00* | (2006.01) |

(52) U.S. Cl.
CPC .............. *B64D 27/24* (2013.01); *B60L 58/12* (2019.02); *B60L 58/13* (2019.02); *B60L 58/14* (2019.02); *B60L 58/15* (2019.02); *B64C 11/305* (2013.01); *B60L 2200/10* (2013.01); *B64C 11/30* (2013.01); *B64D 2027/026* (2013.01); *B64D 2221/00* (2013.01); *F01D 7/00* (2013.01); *F02C 9/58* (2013.01)

(58) Field of Classification Search
CPC ...... F02C 9/58; F01D 7/00; F01D 7/02; B64D 27/24; B64D 2027/026; B64D 2221/00; B64C 11/305; B64C 27/32; B64C 2027/8209; B64C 11/06; B64C 11/30; B60L 58/00; B60L 58/10; B60L 58/12; B60L 58/13; B60L 58/14; B60L 58/15; B60L 2200/10
See application file for complete search history.

(56) References Cited

U.S. PATENT DOCUMENTS

| | | | | |
|---|---|---|---|---|
| 2016/0325629 | A1* | 11/2016 | Siegel | B64D 27/24 |
| 2020/0144828 | A1* | 5/2020 | Gu | B60L 58/12 |
| 2021/0171212 | A1* | 6/2021 | Keller | B64D 31/06 |

FOREIGN PATENT DOCUMENTS

JP 2003-032906 1/2003

* cited by examiner

*Primary Examiner* — Christopher Verdier
(74) *Attorney, Agent, or Firm* — AMIN, TUROCY & WATSON, LLP

(57) ABSTRACT

A control device (1) of a flying object includes a generator (11), a driving source (12), a battery (13), an electric motor (3), a rotor blade (4), a battery status determination part (5), a variable pitch mechanism (6), and a pitch change control part (7). The electric motor (3) is driven by electric power supplied from at least one of the generator (11) and the battery (13). The rotor blade (4) is driven by the electric motor (3). The battery status determination part (5) determines a state of charge of the battery (13). The variable pitch mechanism (6) changes a pitch of the rotor blade (4). The pitch change control part (7) determines whether the pitch of the rotor blade (4) is changed based on a charging rate of the battery determined by the battery status determination part (5).

4 Claims, 3 Drawing Sheets

CONTROL DEVICE OF FLYING OBJECT

CROSS-REFERENCE TO RELATED APPLICATION

Priority is claimed on Japanese Patent Application No. 2021-207198, filed Dec. 21, 2021, the content of which is incorporated herein by reference.

BACKGROUND OF THE INVENTION

Field of the Invention

The present invention relates to a control device of a flying object.

Description of Related Art

In the related art, flying objects each including a driving source such as a gas turbine engine or the like and a battery configured to store electric power generated by the driving source are known. In these flying objects, technologies of suppressing deterioration of batteries such as overcharge or the like have been variously proposed.

For example, Patent Literature 1 (Japanese Unexamined Patent Application, First Publication No. 2003-32906) discloses a configuration of electric power source equipment including a fuel cell, and a battery configured to store surplus electric power of the fuel cell and discharge the electric power to output the electric power to the outside upon output insufficiency of the fuel cell. The electric power source equipment further has an electric power consumption unit configured to consume the electric power, and when the generated electric power of the fuel cell is greater than a load electric power and the battery is in a fully-charged state, the electric power that is excess is consumed by the electric power consumption unit.

According to the technology disclosed in Patent Literature 1, a mechanism (an electric power consumption unit) of a part of the entire system is operated, excess electric power is consumed, and thus, overcharge of the battery can be suppressed.

SUMMARY OF THE INVENTION

Incidentally, in the related art, flying objects each having a generator driven by a driving source, a battery configured to store surplus electric power of the generator, and a propeller (a rotor blade) driven by electric power from the generator or the battery, and configured to obtain propulsion power by driving the propeller are known. In these flying objects, there is a need to consume excess electric power during flight. For this reason, for example, there is also a need to maintain a flight state of the flying object while operating the mechanism of a part of the entire system.

Here, the present invention is directed to providing a control device of a flying object capable of suppressing deterioration of a battery while maintaining a flight state.

In order to solve the above-mentioned problems, a control device of a flying object according to the present invention employs the following configurations.

(1) A control device of a flying object according to an aspect of the present invention includes a power unit including a generator, a driving source configured to drive the generator, and a battery configured to store electric power generated by the generator; an electric motor driven by electric power supplied from at least one of the generator and the battery; a rotor blade driven by the electric motor; a battery status determination part configured to determine a state of charge of the battery; a variable pitch mechanism configured to change a pitch of the rotor blade; and a pitch change control part configured to determine whether the pitch of the rotor blade is to be changed based on a charging rate of the battery determined by the battery status determination part.

(2) In the control device of the flying object according to the aspect of the above-mentioned (1), the pitch change control part may calculate a rate of change of the pitch of the rotor blade based on electric energy supplied from the power unit.

(3) In the control device of the flying object according to the aspect of the above-mentioned (1) or (2), the pitch change control part may perform change of the pitch when a decrease in demand output from a flight controller of the flying object to the power unit is required.

According to the aspect of the above-mentioned (1), for example, when the charging rate of the battery determined by the battery status determination part is the predetermined value or more, the pitch of the rotor blade is changed by the pitch change control part. Specifically, the pitch change control part changes the pitch of the rotor blade to increase a load of the electric motor that rotates the rotor blade. Accordingly, efficiency in the rotor blade is decreased, and electric power consumption in the rotor blade can be increased while maintaining the flight state. Accordingly, excess electric power can be effectively consumed by increasing consumption of the electric power of the battery or the electric power generated by the generator. As a result, deterioration of the battery due to overcharge can be suppressed.

Accordingly, it is possible to provide the control device of the flying object capable of suppressing deterioration of the battery while maintaining the flight state. Further, for example, when the charging rate of the battery is low, the pitch of the rotor blade is changed to reduce the load of the electric motor. Accordingly, the electric power generated by the generator can be distributed as electric power charged to the battery by the operation of the driving source. Accordingly, the load of the driving source can be reduced, and deterioration of fuel efficiency can be suppressed.

According to the aspect of the above-mentioned (2), since the rate of change of the pitch of the rotor blade is determined based on the electric energy supplied from the power unit, the rate of change of the pitch can be set according to the electric power that is to be consumed. Accordingly, it is possible to suppress application of excessive load to the rotor blade or the variable pitch mechanism.

According to the aspect of the above-mentioned (3), the change of the pitch is performed when the decrease in demand output is required. Here, the driving source often cannot respond to the demand from the flight controller for a short time. That is, power supply (charging) to the battery may be performed between the demand for the output decrease from the flight controller to the power unit and the actual decrease in output of the driving source. For this reason, in particular, when the decrease in demand output is required and the battery is in a full charge state, conditions of excess electric power consumption becomes stricter compared to when the increase in demand output is required. According to the control device of the flying object of the present invention, since change of the pitch is performed when the decrease in demand output is required, it is possible to more effectively consume the excess electric power according to the electric power consumed by the pitch change and an increase in load of the electric motor due to the increase in resistance of the rotor blade according to the pitch change.

DETAILED DESCRIPTION OF THE INVENTION

Hereinafter, an embodiment of the present invention will be described with reference to the accompanying drawings.
(Control Device of Flying Object)

Figure 1:
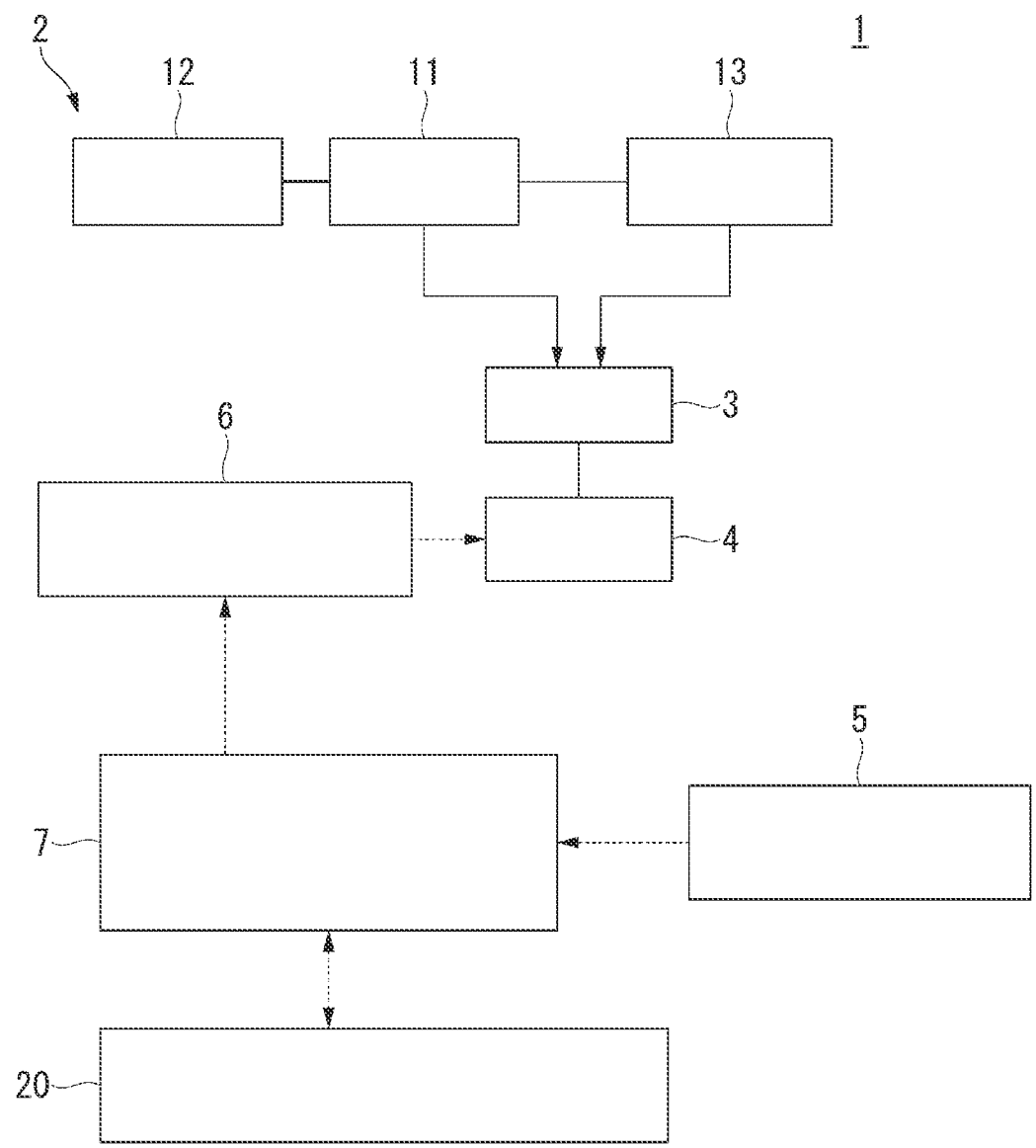
FIG. 1 is a circuit configuration view of a control device of a flying object according to an embodiment.

FIG. 1 is a circuit configuration view of a control device 1 of a flying object according to an embodiment (hereinafter, may be simply referred to as the control device 1).

The control device 1 is mounted on an airframe of a flying object (not shown) such as an aircraft or the like. The control device 1 constitutes a hybrid propulsion system configured to propel a flying object using a plurality of electric motors 3 driven by electric power generated by a generator 11, which will be described in detail.

The control device 1 includes a power unit 2, the electric motors 3, a rotor blade 4, a battery status determination part 5, a variable pitch mechanism 6, and a pitch change control part 7.
(Power Unit)

The power unit 2 includes a driving source 12, the generator 11, and a battery 13. The power unit 2 controls driving of the driving source 12, the generator 11 and the battery 13, for example, according to a signal from a flight controller 20.

The driving source 12 is, for example, a gas turbine engine. The gas turbine engine 12 has a compressor and a turbine. The compressor compresses inhaled air suctioned from a ventilating hole (not shown) provided in an airframe of an aircraft. The turbine is connected to the compressor via a rotary shaft and rotated integrally with the compressor. Further, while the gas turbine engine 12 will be described as an example of the driving source in the embodiment, there is no limitation thereto. The driving source 12 may be a power apparatus for operating the generator 11 and generating electric power, or for example, may also be a fuel cell or the like.

The generator 11 is connected to the gas turbine engine 12. A gear shifting mechanism or the like may be provided between the generator 11 and the gas turbine engine 12. The generator 11 generates electric power (alternating current electric power) through driving of the turbine. The alternating current electric power generated by the generator 11 is converted into direct current electric power by a converter of a power drive unit (PDU) and stored in the battery 13.

In the electric power generated by the generator 11 through driving of the gas turbine engine 12, the electric power not consumed by the electric motors 3 is stored in the battery 13. The electric power stored in the battery 13 can be used as electric power that drives the electric motors 3. That is, the battery 13 absorbs and charges the electric power generated by the generator 11 when the generated electric power of the converter exceeds power consumption of the inverter. Meanwhile, the battery 13 discharges to compensate for insufficient electric power when the generated electric power of the converter is below the power consumption of the inverter.
(Electric Motor)

The electric motors 3 are, for example, brushless DC motors. Further, the electric motor 3 may include an assistance motor or the like for posture keeping or horizontal propulsion (not shown). The electric motors 3 are connected to the generator 11 and the battery 13 of the power unit 2, respectively. At least one of the discharged electric power from the battery 13 and the electric power from the generator 11 is supplied to the electric motors 3. That is, supply of the electric power from the generator 11 to the electric motors 3 and supply of the electric power from the battery 13 to the electric motors 3 are appropriately switched between. Specifically, the generator 11, the battery 13, and the electric motors 3 are controlled to be brought into at least one state of the following (i) to (iii).

(i) A state in which electric power from the generator 11 to the electric motors 3 is supplied and supply of the electric power from the battery 13 to the electric motors 3 is stopped.

(ii) A state in which supply of electric power from the generator 11 to the electric motors 3 is stopped and electric power from the battery 13 to the electric motors 3 is supplied.

(iii) A state in which electric power from both the generator 11 and the battery 13 to the electric motors 3 is supplied. Here, a ratio of a supply amount of electric power from the generator 11 and the battery 13 may be changed according to necessity.
(Rotor Blade)

The rotor blade 4 is connected to the electric motor 3. A propeller shaft (not shown) configured to mechanically connect the electric motor 3 and the rotor blade 4 is provided between the electric motor 3 and the rotor blade 4. The rotor blade 4 is rotated by rotating the electric motors 3 according to the control signal. The control signal is a signal for controlling an aircraft based on instructions in pilot operation or autopilot. A pitch of the rotor blade 4 is configured to be changeable. In other words, the flying object of the embodiment is a variable pitch type flying object.

As described above, the flying object is configured to drive the electric motors 3 using electric power generated by the generator 11 driven by mainly the gas turbine engine 12 and obtain thrust using the rotor blade 4 rotated by the electric motors 3. The electric power generated by the generator 11 can be stored in the battery 13, and the electric power from the battery 13 can be used as the electric power for driving the electric motors 3 according to necessity.
(Battery Status Determination Part)

The battery status determination part 5 determines a state of charge of the battery 13. The battery status determination part 5 determines, for example, a battery state of charge (SOC) showing the current charge amount of the battery 13 with respect to a total capacity of the battery 13 as a state of charge of the battery 13. In addition, the battery status determination part 5 may determine, for example, a charge speed upon charging, a discharge speed upon discharge, or the like.
(Variable Pitch Mechanism)

The variable pitch mechanism 6 changes a pitch of the rotor blade 4. The variable pitch mechanism 6 is attached to, for example, the vicinity of a central shaft of the rotor blade 4. The variable pitch mechanism 6 changes a pitch of the rotor blade 4 to become a predetermined pitch angle based on the signal from the pitch change control part 7, which will be described below in detail. In the embodiment, the variable pitch mechanism 6 can change a pitch of the rotor blade 4 from a pitch angle of 0% (a state in which the rotor blade 4 is parallel to the ground surface) to 90% (a state in which the rotor blade 4 is perpendicular to the ground surface).

(Pitch Change Control Part)

The pitch change control part 7 determines whether the pitch of the rotor blade 4 is changed based on a battery SOC determined by the battery status determination part 5. The pitch change control part 7 calculates a rate of change of the pitch based on the electric energy supplied from the power unit 2 when the pitch is changed, and outputs the calculation result to the variable pitch mechanism 6. Accordingly, the pitch of the rotor blade 4 is controlled to become a desired pitch angle.

In the embodiment, the pitch change control part 7 causes the variable pitch mechanism 6 to change the pitch when a decrease in demand output from the flight controller 20 of the flying object to the power unit 2 is required and a predetermined condition is satisfied. Specifically, the pitch change control part 7 changes the pitch when a decrease in demand output is required, an output decrease in the gas turbine engine 12 is insufficient and the battery SOC is a predetermined value or more. Meanwhile, when the output decrease in the gas turbine engine 12 in which the decrease in demand output is required is sufficient (response of the gas turbine engine 12 only is acceptable) and when the battery SOC where the decrease in demand output is required is less than the predetermined value, the pitch is not changed.

In the embodiment, when the decrease in demand output is required to change the pitch, the pitch change control part 7 first calculates excess electric power. The excess electric power is a value obtained by subtracting the sum of the driving electric power of the rotor blade 4 and the electric power of the battery 13 from the generated electric power of the generator 11. After that, the pitch change control part 7 changes the pitch of the rotor blade 4 such that a pitch angle that is a target is smaller than the current pitch angle.

Figure 2:
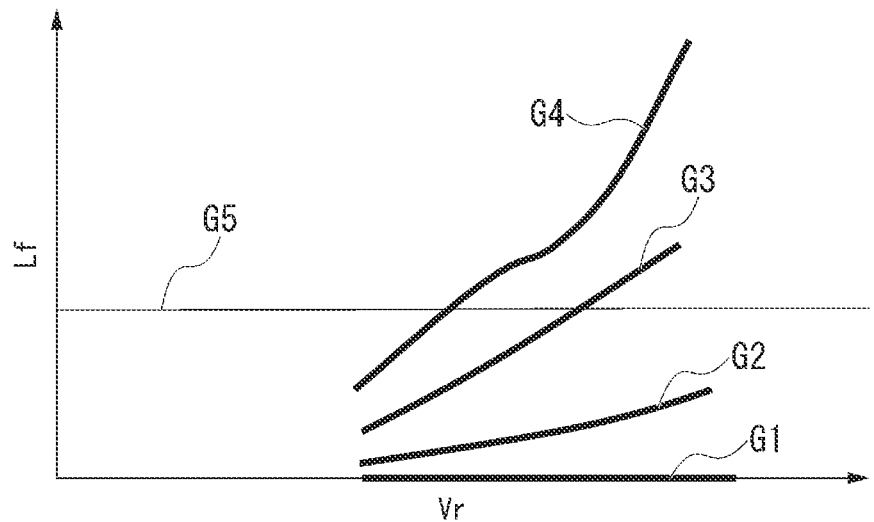
FIG. 2 is a graph showing a relation between a peripheral speed of a rotor blade and a dynamic lift due to a difference in pitch angle.

FIG. 2 is a graph showing a relation between a peripheral speed Vr of the rotor blade 4 and a dynamic lift Lf due to a difference in pitch angle. A graph G1 of FIG. 2 shows a case in which the pitch angle is 0% (the rotor blade 4 is parallel to the ground surface). A graph G2 shows a case in which the pitch angle is 20%. A graph G3 shows a case in which the pitch angle is 40%. A graph G4 shows a case in which the pitch angle is 60%. A lateral axis of the graph shows the peripheral speed Vr of the rotor blade 4. A vertical axis of the graph shows the dynamic lift Lf of the flying object. A graph G5 shows a target dynamic lift of the flying object.

As shown in the graph G1 of FIG. 2, when the pitch angle is 0%, the dynamic lift is zero regardless of the peripheral speed Vr. As shown in the graphs G2 to G4, when the pitch angles are 20%, 40% and 60%, the peripheral speed Vr of the rotor blade 4 is increased and the dynamic lift Lf is increased. When the graphs G2 to G4 are compared, the peripheral speed Vr required to obtain the target dynamic lift G5 is decreased as the pitch angle is increased. That is, required dynamic lift can be obtained with smaller energy as the pitch angle is increased. Meanwhile, in order to obtain the same dynamic lift as the case in which the pitch angle is increased (for example, 60%: a graph G6) when the pitch angle is reduced (for example, 40%: the graph G3), a larger amount of energy is consumed.

Figure 3:
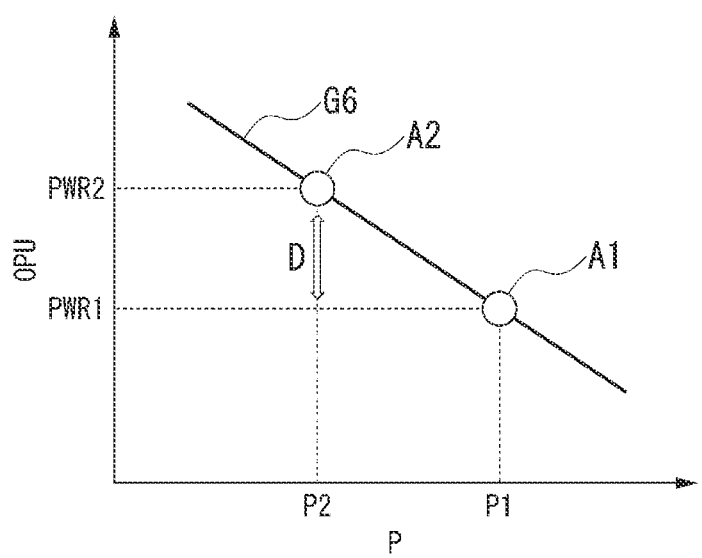
FIG. 3 is a graph showing a relation between a pitch and an output of a power unit.

FIG. 3 is a graph showing a relation between a pitch P and an output OPU of the power unit 2. A lateral axis of the graph shows the pitch P of the rotor blade 4. A vertical axis of the graph shows the output OPU of the power unit 2. The output OPU of the power unit 2 is a total value of the output from the generator 11 and the output from the battery 13. The graph G6 shows the target dynamic lift of the flying object.

As shown in FIG. 3, the flying object is operated at a point A1 at normal time (in the embodiment, a state before the pitch change). The pitch P of the rotor blade 4 is set to a first pitch P1 and the output OPU of the power unit 2 is set to a first output PWR1 at the point A1.

When it is determined that the pitch of the rotor blade 4 is changed by the pitch change control part 7, the pitch change control part 7 changes the pitch P and the output OPU from the power unit 2 such that the flying object is operated at a point A2. The pitch P of the rotor blade 4 is set to a second pitch P2 and the output OPU of the power unit 2 is set to a second output PWR2 at the point A2. The second pitch P2 has a pitch angle smaller than that of the first pitch P1 (P2<P1). The second output PWR2 is greater than the first output PWR1 (PWR2>PWR1).

When the pitch P of the rotor blade 4 is changed from the first pitch P1 to the second pitch P2 in this way, electric power OPU from the power unit 2 required to obtain the target dynamic lift is increased by electric energy D. Accordingly, the pitch change control part 7 can consume the excess electric power by the electric energy D in comparison with normal time by changing from the first pitch P1 to the second pitch P2 when a decrease in demand output is required, an output decrease in the gas turbine engine 12 is insufficient and the battery SOC is the predetermined value or more.

Accordingly, overcharge to the battery 13 is suppressed.

(Control Flow in Control Device of Flying Object)

Figure 4:
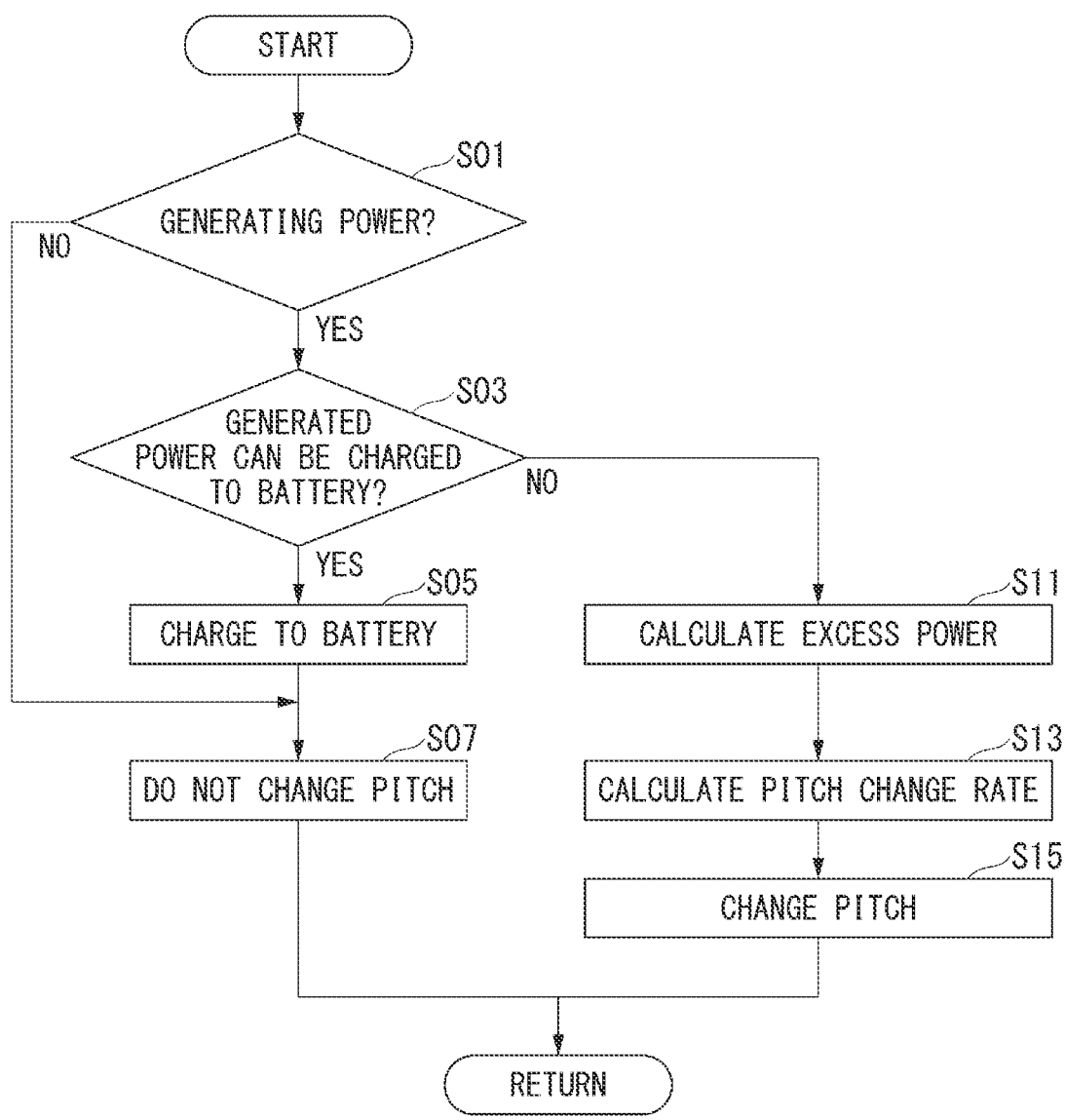
FIG. 4 is a flowchart showing a flow of control by the control device according to the embodiment.

FIG. 4 is a flowchart showing a control flow by the control device 1 according to the embodiment. Hereinafter, the control flow in the control device 1 will be described with reference to FIG. 4 in more detail. Reference signs also refer to FIG. 1 together.

First, the control device 1 determines whether the generator 11 is in power generation by acquiring information of the gas turbine engine 12 (driving source) and the generator 11 (step S01). When the generator 11 is not in power generation (NO in step S01), the pitch change control part 7 terminates the processing without changing the pitch of the rotor blade 4 (step S07).

When it is determined that the generator 11 is in power generation (YES in step S01), the control device 1 determines whether the generated electric power can be charged in the battery 13 (step S03). In step S03, the control device 1 determines whether the battery 13 can be charged based on the determination result of, for example, whether the current battery SOC is the predetermined value or more, which is previously set. The control device 1 determines that charge to the battery 13 becomes impossible, for example, when the current battery SOC is the predetermined value or more. Meanwhile, for example, when the current battery SOC is less than the predetermined value, the control device 1 determines that charge to the battery 13 becomes possible.

When it is determined that the generated electric power can be charged in the battery 13 (YES in step S03), the control device 1 starts charging the battery 13 (step S05). After that, the processing advances to step S07, and the processing is terminated without performing the pitch change.

Meanwhile, when it is determined that the generated electric power cannot be charged in the battery 13 (NO in step S03), the pitch change control part 7 calculates excess electric power based on the acquired result of the generated electric power of the generator 11, the driving electric power of the rotor blade 4, and the electric power of the battery 13 (step S11). Next, the pitch change control part 7 calculates a rate of change of the pitch based on the calculated excess electric power (step S13). The rate of change of the pitch is a rate of change from the current pitch to a target pitch. For example, the target pitch is calculated by multiplying a correction factor of 1 or less by a reference pitch. The correction factor may be, for example, a value that changes according to the magnitude of the excess electric power. For example, the correction factor may be set such that the value of the correction factor is gradually reduced as the excess electric power is increased. The target pitch calculated in this way is a pitch required to consume the excess electric power calculated by increasing the load of the electric motors 3.

Next, the pitch change control part 7 outputs the signal to the variable pitch mechanism 6 to realize the calculated rate of change of the pitch. The variable pitch mechanism 6 changes the pitch of the rotor blade 4, which is a target pitch, based on the signal from the pitch change control part 7 (step S15). When the change of the pitch is ended, the processing is terminated. Accordingly, the processing of the flowchart is terminated.

(Actions and Effects)

Next, actions and effects of the control device 1 of the flying object will be described.

According to the control device 1 of the flying object of the embodiment, the control device 1 includes the variable pitch mechanism 6 configured to change the pitch of the rotor blade 4, and the pitch change control part 7 configured to determine whether the pitch of the rotor blade 4 is changed based on the charging rate of the battery 13 determined by the battery status determination part 5. Accordingly, for example, when the charging rate of the battery 13 determined by the battery status determination part 5 is the predetermined value or more, the pitch of the rotor blade 4 is changed by the pitch change control part 7. Specifically, the pitch change control part 7 changes the pitch of the rotor blade 4 to increase the load of the electric motor 3 that rotate the rotor blade 4. Accordingly, since the efficiency in the rotor blade 4 is decreased, the electric power consumption in the rotor blade 4 can be increased while maintaining the flight state. Accordingly, it is possible to effectively consume the excess electric power by increasing the consumption of the electric power of the battery 13 or the electric power generated by the generator 11. As a result, it is possible to suppress deterioration of the battery 13 due to the overcharge. Accordingly, it is possible to provide the control device 1 of the flying object capable of suppressing deterioration of the battery 13 while maintaining the flight state.

The pitch change control part 7 calculates the rate of change of the pitch of the rotor blade 4 based on the electric energy supplied from the power unit 2. Accordingly, the rate of change of the pitch can be set according to the extent of the electric power that is to be consumed. Accordingly, it is possible to suppress application of the excessive load to the rotor blade 4 or the variable pitch mechanism 6.

The pitch change control part 7 performs change of the pitch when the decrease in demand output is required. Here, the gas turbine engine 12 (driving source) often cannot respond to the demand from the flight controller 20 for a short time. That is, power supply (charging) to the battery 13 may be performed between the demand for the output decrease from the flight controller 20 to the power unit 2 and the actual decrease in output of the gas turbine engine 12. For this reason, in particular, when the decrease in the demand output is required and the battery 13 is in a full charge state, the consumption condition of the excess electric power becomes stricter compared to when the increase in demand output is required. According to the control device 1 of the flying object of the present invention, since the change of the pitch is performed when the decrease in demand output is required, the excess electric power can be more effectively consumed by the electric power consumed with the pitch change and an increase in load of the electric motors 3 by the increase in resistance of the rotor blade 4 according to the pitch change.

Further, the technical scope of the present invention is not limited to the above-mentioned embodiment, and various changes may be made without departing from the spirit of the present invention.

For example, while the pitch change is performed when the decrease in demand output is required and the battery SOC is the predetermined value or more in the above-mentioned embodiment, there is no limitation thereto. For example, when the SOC of the battery 13 is lower than a lower limit value that was preset, the pitch of the rotor blade 4 may be changed (the pitch angle may be increased) such that the load of the electric motors 3 is decreased. Accordingly, the electric power generated by the generator 11 due to the operation of the gas turbine engine 12 can be distributed as charged electric power to the battery 13. Accordingly, the load of the gas turbine engine 12 can be reduced, and deterioration of the fuel efficiency can be suppressed.

The gas turbine engine 12 or the generator 11 may be provided in plural.

While the example in which the gas turbine engine 12 is used as a driving source has been described, there is no limitation thereto. For example, a fuel cell or the like may be used as the driving source 12.

In addition, the components in the above-mentioned embodiment may be appropriately replaced with known components and the embodiment described above may be combined as appropriate without departing from the spirit of the present invention.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1 Control device of flying object
2 Power unit
3 Electric motor
4 Rotor blade
5 Battery status determination part
6 Variable pitch mechanism
7 Pitch change control part
11 Generator
12 Gas turbine engine (driving source)
13 Battery
20 Flight controller

What is claimed is:

1. A method for controlling a flying object, comprising:
   determining a state of charge of a battery, wherein the battery is configured to store electric power generated by a generator driven by an engine;
   changing a pitch of a rotor blade driven by an electric motor, wherein the electric motor is driven using electric power supplied from at least one of the generator or the battery; and
   determining whether the pitch of the rotor blade is to be changed based on a charging rate of the battery.

2. The method for controlling the flying object according to claim 1, further comprising:
   calculating a rate of change of the pitch of the rotor blade based on supplied electric energy.

3. The method for controlling the flying object according to claim 1, further comprising:
   changing the pitch when a decrease in demand output from a flight controller of the flying object to the power unit is required.

4. The method for controlling the flying object according to claim 2, further comprising:
   changing the pitch when a decrease in demand output from a flight controller of the flying object is required.

* * * * *